United States Patent

[11] 3,588,217

[72] Inventor Einar S. Mathisen
Poughkeepsie, N.Y.
[21] Appl. No. 833,906
[22] Filed June 17, 1969
[45] Patented June 28, 1971
[73] Assignee International Business Machines, Corporation
Armonk, N.Y.

[54] COHERENT OPTICAL NOISE SUPPRESSION APPARATUS
7 Claims, 1 Drawing Fig.
[52] U.S. Cl................................................. 350/3.5,
350/96
[51] Int. Cl.............................................. G02b 27/00
[50] Field of Search........................................ 350/3.5, 96

[56] References Cited
UNITED STATES PATENTS
3,490,827 1/1970 Van Ligten et al. .......... 350/3.5

*Primary Examiner*—David Schonberg
*Assistant Examiner*—Ronald J. Stern
*Attorneys*—Hanifin and Jancin and William S. Robertson

ABSTRACT: In an apparatus for displaying the image of a hologram, a fiber optic device is located to form part of the path of the coherent light illuminating the hologram and is moved at its midsection while the ends are held rigid as the hologram is viewed. This operation of the apparatus changes the interference patterns that are attributable to the light source and not the hologram and thereby reduces speckle noise that otherwise occurs in the hologram.

PATENTED JUN28 1971
3,588,217
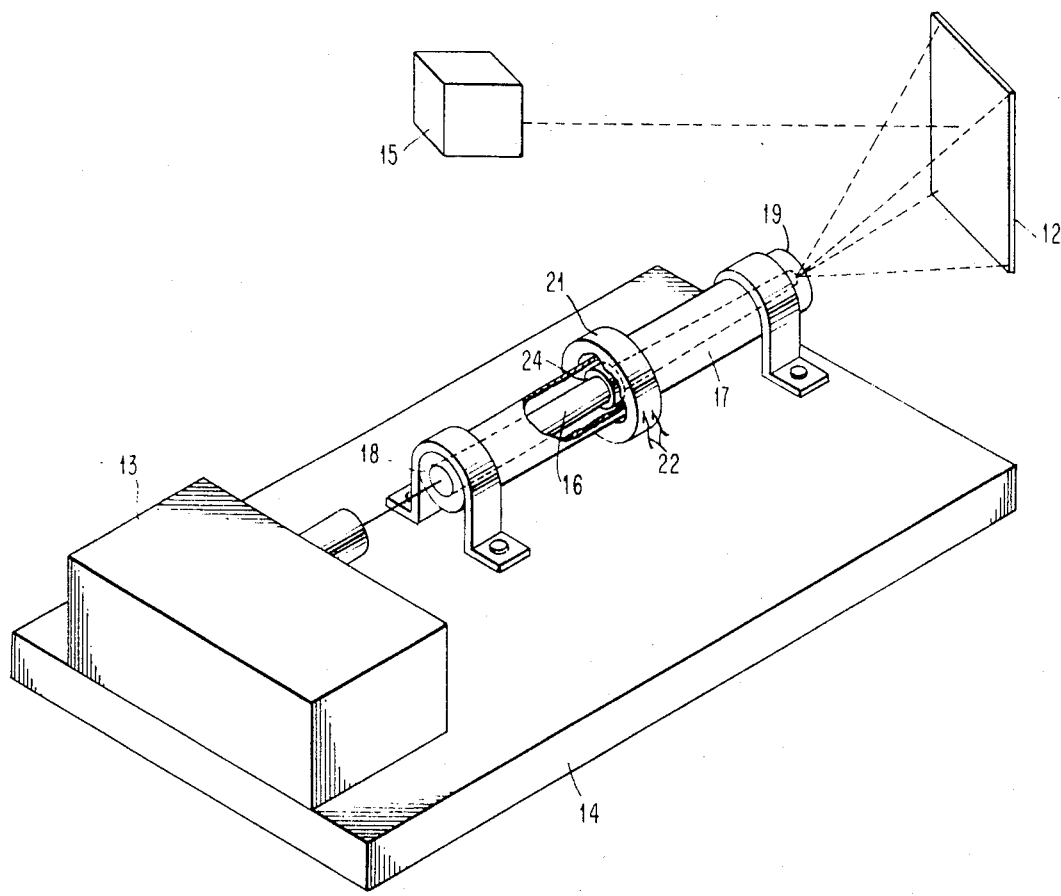
INVENTOR
EINAR S. MATHISEN
BY W. Robertson
ATTORNEY 3,588,217

COHERENT OPTICAL NOISE SUPPRESSION APPARATUS

INTRODUCTION

Speckle noise is a serious problem in holograms. A hologram is viewed as it is illuminated from a point source of coherent monochromatic light. As the light from such a source is differently reflected (or otherwise influenced) from different points on an illuminated subject, the wave fronts interfere and produce patterns that are visible as speckles. These interference patterns have nothing to do with the information content of the light. For example, a plain white surface illuminated by ordinary diffuse light would appear to be white, but illuminated from a point source of coherent light would appear to be speckled. When a hologram is illuminated by such a light source, speckling is superimposed on the information content and the picture quality may be seriously degraded. The effect is particularly serious in holograms of small subjects. Pictures showing the speckle noise effect appear on pages 2281 and 2282 of Applied Optics, Nov., 1968.

PRIOR ART

It is known that the speckle effect can be reduced or eliminated by producing a succession of different wave fronts as the hologram is viewed. Each wave front produces interference patterns and the associated speckle effect, as has already been explained. However, in the changing pattern of speckle noise, the noise substantially disappears.

The prior art has suggested rotating a thin transparent wedge in the optical path of the coherent light source. As the wedge rotates, it changes the interference patterns and thereby reduces speckle noise, but unfortunately it also changes the direction of incidence of the light beam on the hologram. An object of this invention is to provide a new and improved means for eliminating speckle noise without the accompanying distortion of the image produced by changing the incidence of the beam on the object.

SUMMARY OF THE INVENTION

This invention provides a fiber optic device located to form part of the optical path of the coherent light source associated with a hologram. One end of the fiber optic is fixed to receive light from a laser or other similar light source and the other end is fixed to transmit light to illuminate the hologram. With this arrangement the incidence of the light path hologram is fixed. The midsection of the fiber optic is supported flexibly so that it can be moved as the hologram is viewed. The person viewing the hologram can simply tap the fiber optic with his finger to provide a suitable motion, but other means will be described later.

Light is transmitted through a fiber optic by internal reflections. Thus, the actual path of the light is somewhat longer than the fiber optic itself. As the fiber optic is bent in the apparatus of this invention, the optical path length is changed and the interference patterns are changed. Thus, the apparatus of this invention has the advantage of changing the path length without changing the optical incidence of the light on the hologram. From a more general standpoint, the apparatus of this invention is useful for illuminating a subject with coherent light at a fixed incidence but without the interference pattern associated with such a light source. The description of the preferred embodiment of the invention will suggest other objects, advantages and features of the invention.

BRIEF DESCRIPTION OF THE DRAWING

In the drawing the single FIGURE shows the fiber optic device of this invention and schematically shows components used with the new fiber optic device for viewing a hologram.

APPARATUS OF THE DRAWING

Conventional Components. The drawing shows a well-known arrangement of a hologram 12 and a coherent light source 13. A suitable base 14 is provided for supporting source 13 and other apparatus. A person viewing the hologram from the side opposite the light source sees a virtual object 15. In conventional apparatus, the viewer will also see interference patterns that are associated with the spherical wave fronts of the light source and are entirely independent of the information content of the hologram. The apparatus of the drawing will readily suggest variations in the system for illuminating and viewing or otherwise sensing a hologram for which the apparatus of this invention is helpful for removing speckle noise.

THE SPECKLE NOISE ELIMINATING APPARATUS

A fiber optic 16 is positioned to transmit light along a portion of the path between source 13 and hologram 12. One end of fiber optic 16 is positioned with respect to hologram 12 during viewing to illuminate the hologram at a particular incidence. The other end is positioned to receive light from source 13. [Ordinarily source 13 is fixed with respect to hologram 12 during viewing.] The fiber optic may be tapered to provide a point source of light at its output end. In the embodiment of the drawing, the fiber optic is partially enclosed in a metal tube 17 and its ends are supported within openings in end pieces 18 and 19 of the tube which are mounted on base 14.

Tube 16 supports an element 21 that is energized through wires 22 and cooperates with a collar 24 mounted on fiber optic 16 to form means for moving the fiber optic at its midpoint. Many such drivers 21, 24 are well known that are suitable for driving the fiber optic in a reciprocal, circular or other suitable motion. For example, collar 24 may be of magnetic material and element 21 may comprise electromagnets energized by alternating current and positioned to vibrate the fiber optic. Many other means for moving the fiber optic will be apparent.

In a simplified embodiment, tube 17 is given an opening approximately like the cutaway portion of the drawing so that a person viewing the hologram can simply tap the fiber optic with his finger. With this method of moving the fiber optic and with some mechanical drive arrangements, the tube 17 may be eliminated and the fiber optic is supported by end pieces 18, and 19.

The device can be constructed with a single fiber which may be smaller in diameter than the laser beam; a lens is provided for focusing the laser beam on the light receiving end of the film.

From the description of the preferred embodiment and several suggested variations, those skilled in the art will recognize many applications for the device of this invention and appropriate modifications within the intended scope of the claims.

I claim:

1. Apparatus for illuminating a subject from a source of coherent light at a selected angle of incidence and with variations in the interference patterns associated with the source, comprising:
   a fiber optic light guide for transmitting light from said source to said subject;
   means supporting one end of said fiber optic light guide to receive light from said source and supporting the other end of said fiber optic light guide in fixed relation to said subject during illumination with a portion of said fiber optic light guide between said ends free for motion during illumination; and
   means for moving said portion relative to said ends of said fiber optic light guide, whereby speckle noise is reduced by time averaging.

2. The apparatus of claim 1 in which said subject is a hologram.

3. The apparatus of claim 2 in which said means is an electromechanical driver.

4. The apparatus of claim 2 in which said supporting means comprises a tube partially enclosing said fiber optic light guide and supporting said ends.

5. The apparatus of claim 2 in which said fiber optic light guide is tapered to form a point source for illuminating said hologram.

6. The apparatus of claim 2 in which said supporting means includes means holding said ends in relatively fixed positions.

7. A method of viewing a hologram with reduced speckle noise from a coherent light source illuminating the hologram, comprising:

locating a fiber optic light guide to form a portion of the light path from said source to said hologram;

maintaining the light output end of said fiber optic light guide fixed with respect to said hologram during viewing; and moving a portion of said fiber optic light guide with respect to said fixed end during viewing.